US012641209B2

(12) United States Patent
　　Cole et al.

(10) Patent No.: US 12,641,209 B2
(45) Date of Patent: **\*May 26, 2026**

(54) METHODS AND APPARATUS FOR STREAMING CONTENT

(71) Applicant: Nevermind Capital LLC, Wilmington, DE (US)

(72) Inventors: David Michael Cole, Aliso Viejo, CA (US); Alan McKay Moss, Laguna Beach, CA (US)

(73) Assignee: Nevermind Capital LLC, Wilmington, DE (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/456,039

(22) Filed: Aug. 25, 2023

(65) Prior Publication Data

US 2023/0403384 A1　　Dec. 14, 2023

Related U.S. Application Data

(63) Continuation of application No. 15/597,103, filed on May 16, 2017, now abandoned, which is a
(Continued)

(51) Int. Cl.
　H04N 13/189　　(2018.01)
　G11B 27/30　　(2006.01)
(Continued)

(52) U.S. Cl.
　CPC ........... H04N 13/189 (2018.05); G11B 27/30 (2013.01); G11B 27/34 (2013.01); H04L 65/70 (2022.05);
(Continued)

(58) Field of Classification Search
None
See application file for complete search history.

(56) References Cited

U.S. PATENT DOCUMENTS

| 6,337,882 B1 * | 1/2002 | Boyer | ................ H04N 21/4728 |
| | | | 375/240.26 |
| 2002/0126914 A1 * | 9/2002 | Kotake | ................. G06T 15/205 |
| | | | 382/284 |

(Continued)

FOREIGN PATENT DOCUMENTS

| CN | 102413376 A | 4/2012 |
| CN | 102438123 A | 5/2012 |

(Continued)

OTHER PUBLICATIONS

Yamamoto, et al., "PanoVi: Panoramic Movie System for Real-Time Network Transmission," 2001 IEEE Fourth Workshop on Multimedia Signal Processing, Oct. 5, 2001.

*Primary Examiner* — Daniel T Tekle
(74) *Attorney, Agent, or Firm* — Blank Rome LLP

(57) ABSTRACT

Methods and apparatus for streaming content corresponding to a 360 degree field of view are described. The methods and apparatus of the present invention are well suited for use with 3D immersion systems and/or head mounted display which allow a user to turn his or her head and see a corresponding scene portion. The methods and apparatus can support real or near real time streaming of 3D image content corresponding to a 360 degree field of view.

20 Claims, 8 Drawing Sheets

Related U.S. Application Data continuation of application No. 14/252,289, filed on Apr. 14, 2014, now Pat. No. 9,699,437.

(60) Provisional application No. 61/947,312, filed on Mar. 3, 2014.

(51) Int. Cl.

| | |
|---|---|
| *G11B 27/34* | (2006.01) |
| *H04L 65/70* | (2022.01) |
| *H04N 13/194* | (2018.01) |
| *H04N 13/344* | (2018.01) |
| *H04N 13/366* | (2018.01) |
| *H04N 21/218* | (2011.01) |
| *H04N 21/2662* | (2011.01) |
| *H04N 21/6587* | (2011.01) |
| *H04N 21/81* | (2011.01) |

(52) U.S. Cl.
CPC ......... *H04N 13/194* (2018.05); *H04N 13/344* (2018.05); *H04N 13/366* (2018.05); *H04N 21/21805* (2013.01); *H04N 21/2662* (2013.01); *H04N 21/6587* (2013.01); *H04N 21/816* (2013.01); *G09G 2340/0435* (2013.01); *G09G 2350/00* (2013.01)

(56) References Cited

U.S. PATENT DOCUMENTS

| | | | | | |
|---|---|---|---|---|---|
| 2005/0195128 | A1 | 9/2005 | Sefton | | |
| 2012/0098925 | A1 | 4/2012 | Dasher | | |
| 2013/0129304 | A1 | 5/2013 | Feinson | | |
| 2013/0141523 | A1* | 6/2013 | Banta | ................. | H04N 21/4728 |
| | | | | | 348/36 |
| 2013/0145415 | A1* | 6/2013 | Major | ............. | H04N 21/47217 |
| | | | | | 725/110 |
| 2013/0212636 | A1* | 8/2013 | Yeh | ........................ | G06F 3/1462 |
| | | | | | 725/127 |
| 2014/0270684 | A1* | 9/2014 | Jayaram | .............. | H04N 5/0733 |
| | | | | | 386/224 |

FOREIGN PATENT DOCUMENTS

| | | | |
|---|---|---|---|
| EP | 0940993 | A2 | 9/1999 |
| EP | 1162830 | A2 | 12/2001 |
| JP | 2002269591 | A | 9/2002 |
| KR | 20130107263 | A | 10/2013 |
| TW | 201125358 | A | 7/2011 |
| WO | 0008889 | A1 | 2/2000 |

* cited by examiner

300

302

360° STEREOSCOPIC VERSION OF A SCENE

304

PARTITION INTO N SCENE PORTIONS, E.G., FORWARD 180°, LEFT REAR 90°, RIGHT REAR 90°

306

ENCODE SCENE PORTIONS TO SUPPORT MULTIPLE POSSIBLE BIT RATE STREAMS FOR EACH PORTION

308

STORE ENCODED SCENE PORTIONS FOR STREAMING TO CUSTOMERS

400

402
INPUT IMAGE PORTION, E.G., 180° FRONT PORTION

404
ENCODER 1
FULL HD

412
HIGH BIT RATE HD FRONT PORTION ENCODED VERSION 1

406
ENCODER 2
SD

414
SD FRONT PORTION ENCODED VERSION 2

408
ENCODER 3
REDUCED FRAME RATE SD

416
REDUCED RATE SD FRONT PORTION ENCODED VERSION 3

410
ENCODER K
HIGH COMPRESSION REDUCED FRAME RATE SD

420
FRONT PORTION ENCODED VERSION K

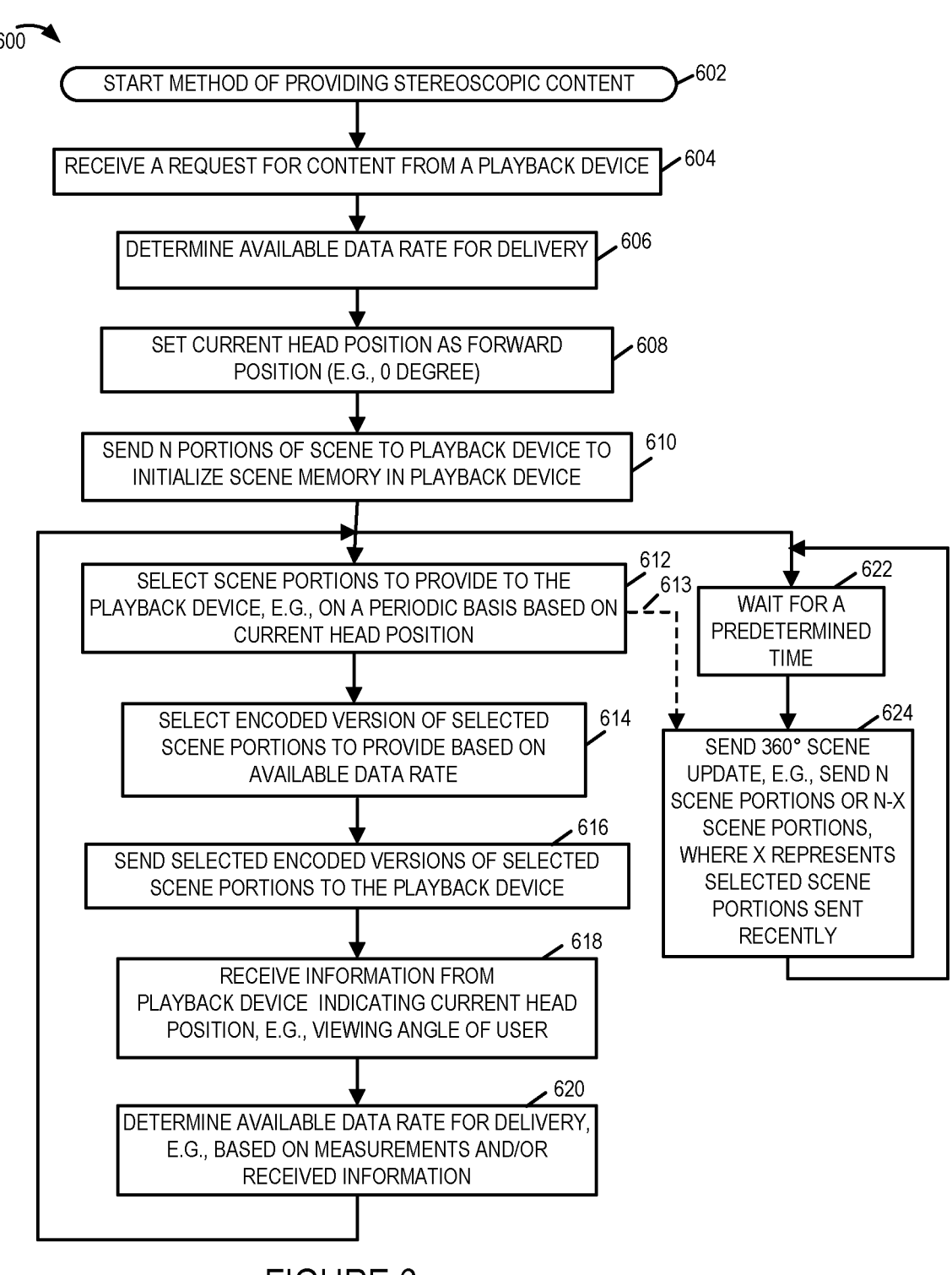

600

602 START METHOD OF PROVIDING STEREOSCOPIC CONTENT

604 RECEIVE A REQUEST FOR CONTENT FROM A PLAYBACK DEVICE

606 DETERMINE AVAILABLE DATA RATE FOR DELIVERY

608 SET CURRENT HEAD POSITION AS FORWARD POSITION (E.G., 0 DEGREE)

610 SEND N PORTIONS OF SCENE TO PLAYBACK DEVICE TO INITIALIZE SCENE MEMORY IN PLAYBACK DEVICE 612
613 SELECT SCENE PORTIONS TO PROVIDE TO THE PLAYBACK DEVICE, E.G., ON A PERIODIC BASIS BASED ON CURRENT HEAD POSITION

614 SELECT ENCODED VERSION OF SELECTED SCENE PORTIONS TO PROVIDE BASED ON AVAILABLE DATA RATE

616 SEND SELECTED ENCODED VERSIONS OF SELECTED SCENE PORTIONS TO THE PLAYBACK DEVICE

618 RECEIVE INFORMATION FROM PLAYBACK DEVICE INDICATING CURRENT HEAD POSITION, E.G., VIEWING ANGLE OF USER

620 DETERMINE AVAILABLE DATA RATE FOR DELIVERY, E.G., BASED ON MEASUREMENTS AND/OR RECEIVED INFORMATION

622 WAIT FOR A PREDETERMINED TIME

624 SEND 360° SCENE UPDATE, E.G., SEND N SCENE PORTIONS OR N-X SCENE PORTIONS, WHERE X REPRESENTS SELECTED SCENE PORTIONS SENT RECENTLY

FIGURE 6

METHODS AND APPARATUS FOR STREAMING CONTENT

RELATED APPLICATIONS

The present application is a continuation of U.S. patent application Ser. No. 15/597,103 filed on May 16, 2017, which is a continuation of U.S. patent application Ser. No. 14/252,289 filed on Apr. 14, 2014, which claims the benefit of U. S. Provisional Patent Application Ser. No. 61/947,312 filed Mar. 3, 2014, each of which is hereby expressly incorporated by reference in its entirety.

FIELD

The present invention relates to the field of adaptive streaming of content, e.g., stereoscopic image content, and more particularly to acquiring, encoding, streaming and decoding stereoscopic video.

BACKGROUND

Display devices which are intended to provide an immersive experience normally allow a user to turn his head and experience a corresponding change in the scene which is displayed. Head mounted displays sometimes support 360 degree viewing in that a user can turn around while wearing a head mounted display with the scene being displayed changing as the user's head position is changes.

With such devices a user should be presented with a scene that was captured in front of a camera position when looking forward and a scene that was captured behind the camera position when the user turns completely around. While a user may turn his head to the rear, at any given time a user's field of view is normally limited to 120 degrees or less due to the nature of a human's ability to perceive a limited field of view at any given time.

In order to support 360 degrees of view, a 360 degree scene may be captured using multiple cameras with the images being combined to generate the 360 degree scene which is to be made available for viewing.

It should be appreciated that a 360 degree view includes a lot more image data than a simple forward view which is normally captured, encoded for normal television and many other video applications where a user does not have the opportunity to change the viewing angle used to determine the image to be displayed at a particular point in time.

Given transmission the constraints, e.g., network data constraints, associated with content being streamed, it may not be possible to stream the full 360 degree view in full high definition video to all customers seeking to receive and interact with the content. This is particularly the case where the content is stereoscopic content including image content intended to correspond to left and right eye views to allow for a 3D viewing effect.

In view of the above discussion it should be appreciated that there is a need for methods and apparatus for supporting streaming of content in a manner which allows an individual user to alter his viewing position, e.g., by turning his or her head, and to see the desired portion of the 360 degree view while staying within the data streaming constraints associated with the individual user. While not necessary for all embodiments, it is desirable that at least some embodiments allow for multiple users at different locations to receive streams at the same time and view whatever distinct portions of the 360 degree view they desire irrespective of what portion or portions are being viewed by other users.

SUMMARY

Methods and apparatus for supporting delivery, e.g., streaming, of video or other content corresponding to a 360 degree viewing area are described. The methods and apparatus of the present invention are particularly well suited for streaming of stereoscopic and/or other image content where data transmission constraints may make delivery of 360 degrees of content difficult to deliver at the maximum supported quality level, e.g., using best quality coding and the highest supported frame rate. The methods can be used to encode and provide content in real time or near real time but are not limited to such real time applications. Given the ability to support real time and near real time encoding and streaming to multiple users, the method sand apparatus described herein are well suited for streaming scenes of sporting events, concerts and/or other venues where individuals like to view an even and observe not only the stage or field but be able to turn and appreciate views of the environment, e.g., stadium or crowd. By supporting 360 degree viewing and 3d the methods and apparatus of the present invention are well suited for use with head mounted displays intended to provide a user a 3d immersive experience with the freedom to turn and observe a scene from different viewing angles as might be the case if present and the users head turned to the left, right or rear.

In accordance with various embodiments image content, e.g., video content, corresponding to a 360 degree view of an area is partitioned into N portions where each portion corresponds to a different portion of the 360 degree view, where N is at least two. In some embodiments where the 360 degree view is portioned into 3 portions, one portion corresponds to a frontal 180 degree view, a second portion corresponds to a left rear 90 degree portion and another portion corresponds to a right rear 90 degree portion. While three portions are described for purposes of explaining the invention, the 360 degree scene may be divided into more portions. Furthermore, while in some embodiments the portions are non-overlapping, in other embodiments the portions are different but partially overlap.

Video content, e.g., 2-D or stereoscopic (3D) is encoded in a manner that allows the portion to be provided via streams which have different data rates. In some embodiments this involves encoding the same content multiple times with each encoding producing a video bitstream with a different data rate or in a manner, e.g., with enhancement layers, that allows different sets of encoded data to be supplied to support different data rates and correspondingly different levels of quality. In some embodiments the difference in data rates is due to encoding the content at different resolutions spatially, e.g., at different resolutions in spatial domain to produce multiple versions of the same video content but with different resolutions. In other embodiments the difference in data rates is due to encoding the content at different resolutions temporally, e.g., with fewer frames per second being used in the case of lower data rate streams as compared to higher data rate streams. As should be appreciated, reductions in both temporal and spatial resolution are used in combination in some embodiments to produce low data rate streams corresponding to portion of the scene area. While control of spatial and/or temporal resolution can be used to produce data streams of different data rates control of other encoder settings including the level of data compression may, and in some embodiments is, used alone or in addition to control of spatial and/or temporal resolution to produce data streams corresponding to a scene portion with one or more desired data rates.

In the case of real time encoding and transmission, the encoding of each scene portion may be performed separately. Where multiple data rates are to be supported, in various embodiments a plurality of encoders are operated in parallel to produce encoded versions of the scene portion with each encoder produce a version of the scene portion with a different bit rate. Thus, in at least some embodiments, multiple streams corresponding to the same scene portion are available for transmission to a playback device.

As will be discussed further below, different customers are provided with different streams corresponding to the same or different portions of 360 degree scene area depending on: i) their head position, e.g., what angel their head is facing relative to the nominal 0 degree forward viewing position and 2) the data rate which is available for streaming content to the customer.

Normally each user is provided with a front portion, e.g., at least a 120 degree front portion, in addition to one or more portions. In some embodiments the front portion is provided at the highest quality level the available data rate will allow with the transmission of at least a low data rate version of an additional portion. Accordingly during a given time period a user will receive content corresponding to at least two different image portions with the image portions potentially corresponding to different quality levels as may be reflected in resolution, frame rate and/or the amount of data compression applied to the individual scene portions. While portions are provided during a period of time will depend on the indicated viewing angle received from the playback device, e.g., customer premise device such as a gaming console and/or head mounted display.

As the user turns his/her head which image portions are streamed to the user's playback device may vary with the playback device being supplied with the scene portion to which the viewers head is directed and at least one scene portion adjacent the scene portion being viewed as indicated by the reported head viewing angle. In this manner, in the event the user turns his/her head, the playback device should have the scene information need to be displayed readily available.

By controlling the streaming as a function of head position, the entire 360 degree scene need not be streamed at all times resulting in more efficient use of limited bandwidth than would be the case if all portions of the 360 scene where given the same priority for streaming purposes.

In some embodiments the scene is portioned into N equal size portions, e.g., 90 degree portions in the FIG. 2 example. While a user may be supplied with a number of portions corresponding to the same size viewing area at any given time, e.g., a 180 degree viewing area, which portions are supplied will vary depending on the user's viewing angle. In such an embodiment the number of portions which are processed by the playback device remains relatively constant over time but with different portions being supplied depending on viewing angle.

BRIEF DESCRIPTION OF THE DRAWINGS

FIG. 6 is a flowchart illustrating the steps of an exemplary method of streaming content in accordance with an exemplary embodiment implemented using the system of FIG. 1.

DETAILED DESCRIPTION

Figure 1:
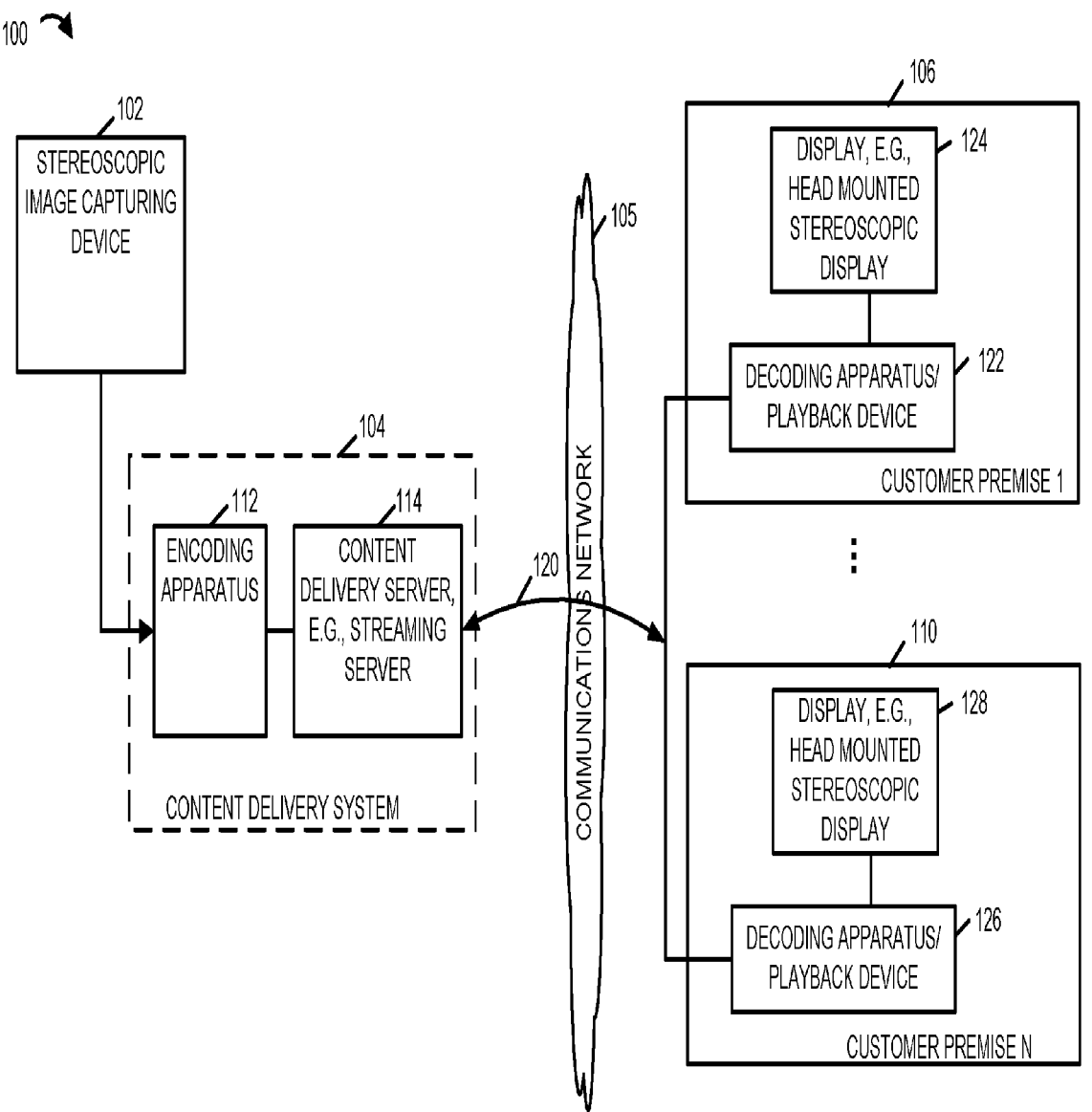
FIG. 1 illustrates an exemplary system implemented in accordance with some embodiments of the invention.

FIG. 1 illustrates an exemplary system 100 implemented in accordance with some embodiments of the invention. The system 900 supports content delivery, e.g., imaging content delivery, to one or more customer devices, e.g., playback devices/content players, located at customer premises. The system 900 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an encoding apparatus 112 and a content streaming device/server 114. The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server are shown as separate physical devices in the FIG. 1 example, in some embodiments they are implemented as a single device which encodes and streams content. The encoding process may be a 3d, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of devices/players, e.g., decoding apparatus to decode and playback/display the imaging content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/ playback devices 122, 126 may be used as the decoding apparatus/playback device 800 shown in FIG. 8. A system/ playback device such as the one illustrated in FIG. 8 can be used as any of the decoding apparatus/playback devices 122, 126.

Figures 2A, 2B, 2C:
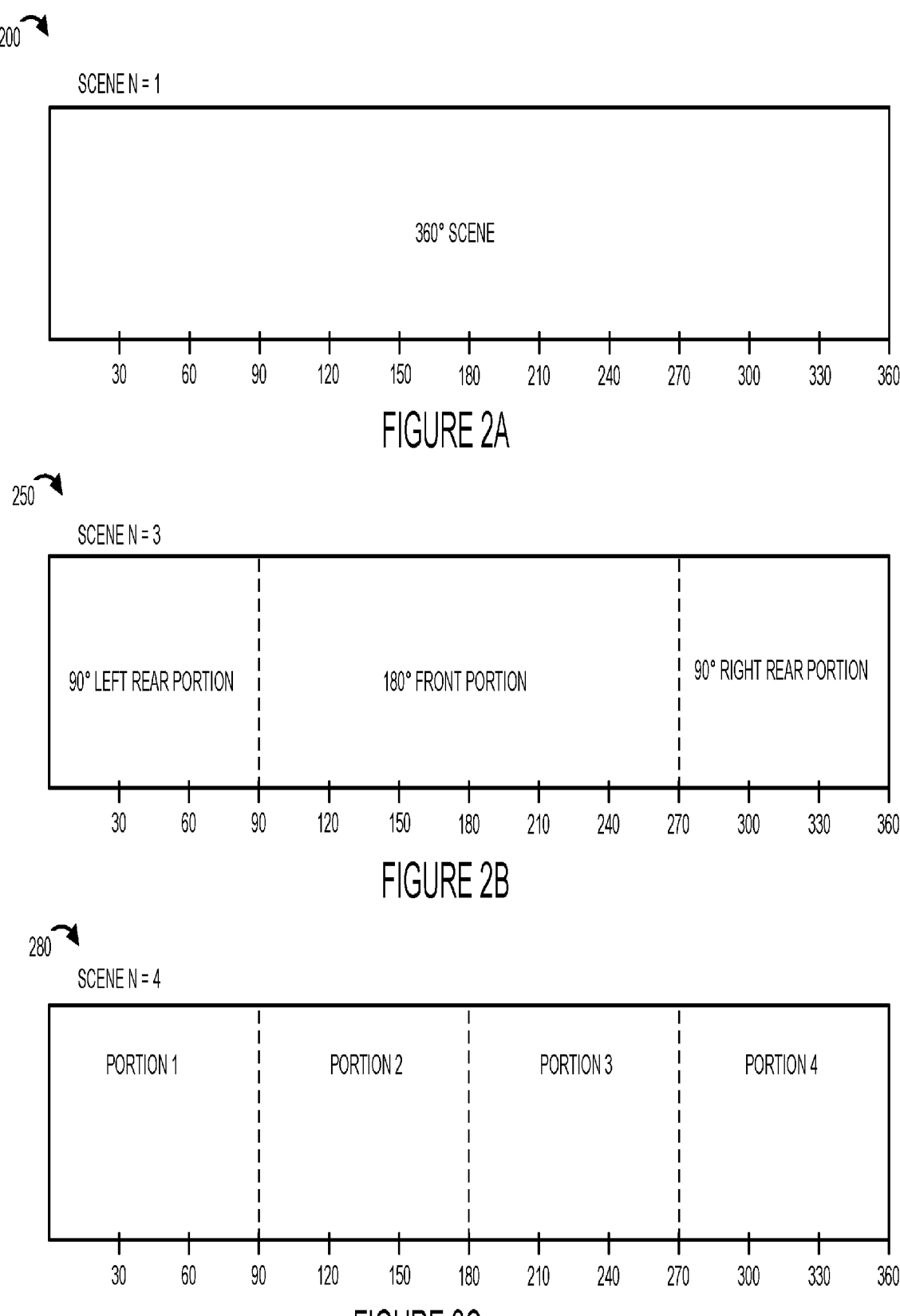
FIG. 2A illustrates an exemplary stereoscopic scene, e.g., a full 360 degree stereoscopic scene which has not been partitioned.
FIG. 2B illustrates an exemplary stereoscopic scene which has been partitioned into 3 exemplary scenes in accordance with one exemplary embodiment.
FIG. 2C illustrates an exemplary stereoscopic scene which has been partitioned into 4 scenes in accordance with one exemplary embodiment.

FIG. 2A illustrates an exemplary stereoscopic scene 200, e.g., a full 360 degree stereoscopic scene which has not been partitioned. The stereoscopic scene maybe and normally is the result of combining image data captured from multiple cameras, e.g., video cameras, often mounted on a single video capture platform or camera mount.

FIG. 2B illustrates a partitioned version 250 of the exemplary stereoscopic scene 200 where the scene has been partitioned into 3 (N=3) exemplary portions, e.g., a front 180 degree portion, a left rear 90 degree portion and a right rear 90 degree portion in accordance with one exemplary embodiment.

FIG. 2C illustrates another portioned version 280 of the exemplary stereoscopic scene 200 which has been partitioned into 4 (N=4) portions in accordance with one exemplary embodiment.

While FIGS. 2B and 2C show two exemplary partitions, it should be appreciated that other partitions are possible. For example the scene 200 may be portioned into twelve (n=12) 30 degree portions. In one such embodiment, rather than individual encoding each partition, multiple partitions are grouped together and encoded as a group. Different groups of partitions may be endowed and streamed to the user with the size of each group being the same in terms of total degrees of scene but corresponding to a different portions of an image which may be streamed depending on the user's head position, e.g., viewing angle as measured on the scale of 0 to 360 degrees.

Figure 3:
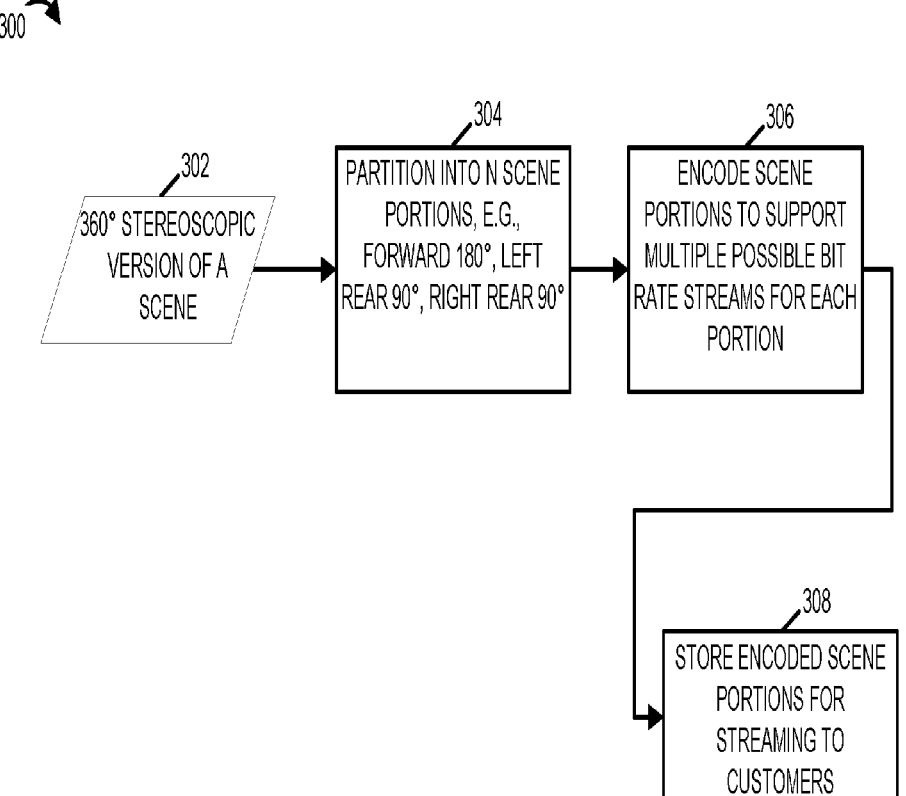
FIG. 3 illustrates an exemplary process of encoding an exemplary 360 degree stereoscopic scene in accordance with one exemplary embodiment.

FIG. 3 illustrates an exemplary process of encoding an exemplary 360 degree stereoscopic scene in accordance with one exemplary embodiment. The input to the method 300 shown in FIG. 3 includes 360 degree stereoscopic image data captured by, e.g., a plurality of cameras arranged to capture a 360 degree view of a scene. The stereoscopic image data, e.g., stereoscopic video, may be in any of a variety of known formats and includes, in most embodiments, left and right eye image data used to allow for a 3D experience. While the methods are particularly well suited for stereoscopic video, the techniques and methods described herein can also be applied to 2D images, e.g., of a 360 degree or small scene area.

In step 304 the scene data 302 is partitioned into data corresponding to different scene areas, e.g., N scene areas corresponding to different viewing directions. For example, in one embodiment such as the one shown in FIG. 2B the 360 degree scene area is portioned into three partitions a left rear portion corresponding to a 90 degree portion, a front 180 degree portion and a right rear 90 degree portion. The different portions may have been captured by different cameras but this is not necessary and in fact the 360 degree scene may be constructed from data captured from multiple cameras before dividing into the N scene areas as shown in FIGS. 2B and 2C.

In step 306 the data corresponding the different scene portions is encoded in accordance with the invention. In some embodiments each scene portion is independently encoded by multiple encoders to support multiple possible bit rate streams for each portion. In step 308 the encoded scene portions are stored, e.g., in the content delivery 104, for streaming to the customer playback devices.

Figure 4:
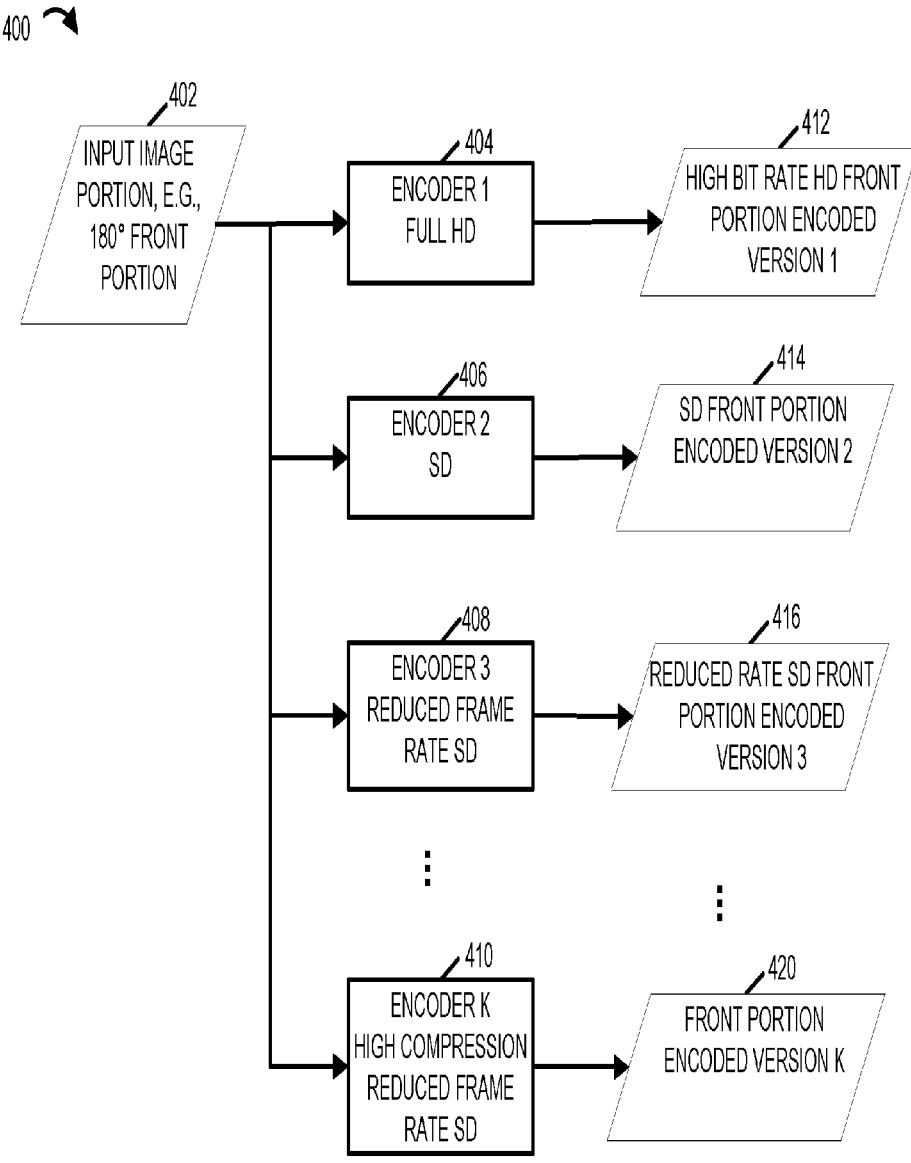
FIG. 4 illustrates an example showing how an input image portion is encoded using a variety of encoders to generate different encoded versions of the same input image portion.

FIG. 4 is a drawing 400 illustrating an example showing how an input image portion, e.g., a 180 degree front portion of a scene, is encoded using a variety of encoders to generate different encoded versions of the same input image portion.

As shown in drawing 400, an input scene portion 402 e.g., a 180 degree front portion of a scene, is supplied to a plurality of encoders for encoding. In the example there are K different encoders which encode input data with different resolutions and using different encoding techniques to generate encoded data to support different data rate streams of image content. The plurality of K encoders include a high definition (HD) encoder 1 404, a standard definition (SD) encoder 2 406, a reduced frame rate SD encoder 3 408, . . . , and a high compression reduced frame rate SD encoder K 410.

The HD encoder 1 404 is configured to perform full high definition (HD) encoding to produce high bit rate HD encoded image 412. The SD encoder 2 406 is configured to perform low resolution standard definition encoding to produce a SD encoded version 2 414 of the input image. The reduced frame rate SD encoder 3 408 is configured to perform reduced frame rate low resolution SD encoding to produce a reduced rate SD encoded version 3 416 of the input image. The reduced frame rate may be, e.g., half of the frame rate used by the SD encoder 2 406 for encoding. The high compression reduced frame rate SD encoder K 410 is configured to perform reduced frame rate low resolution SD encoding with high compression to produce a highly compressed reduced rate SD encoded version K 420 of the input image.

Thus it should be appreciated that control of spatial and/or temporal resolution can be used to produce data streams of different data rates and control of other encoder settings such as the level of data compression may also be used alone or in addition to control of spatial and/or temporal resolution to produce data streams corresponding to a scene portion with one or more desired data rates.

Figure 5:
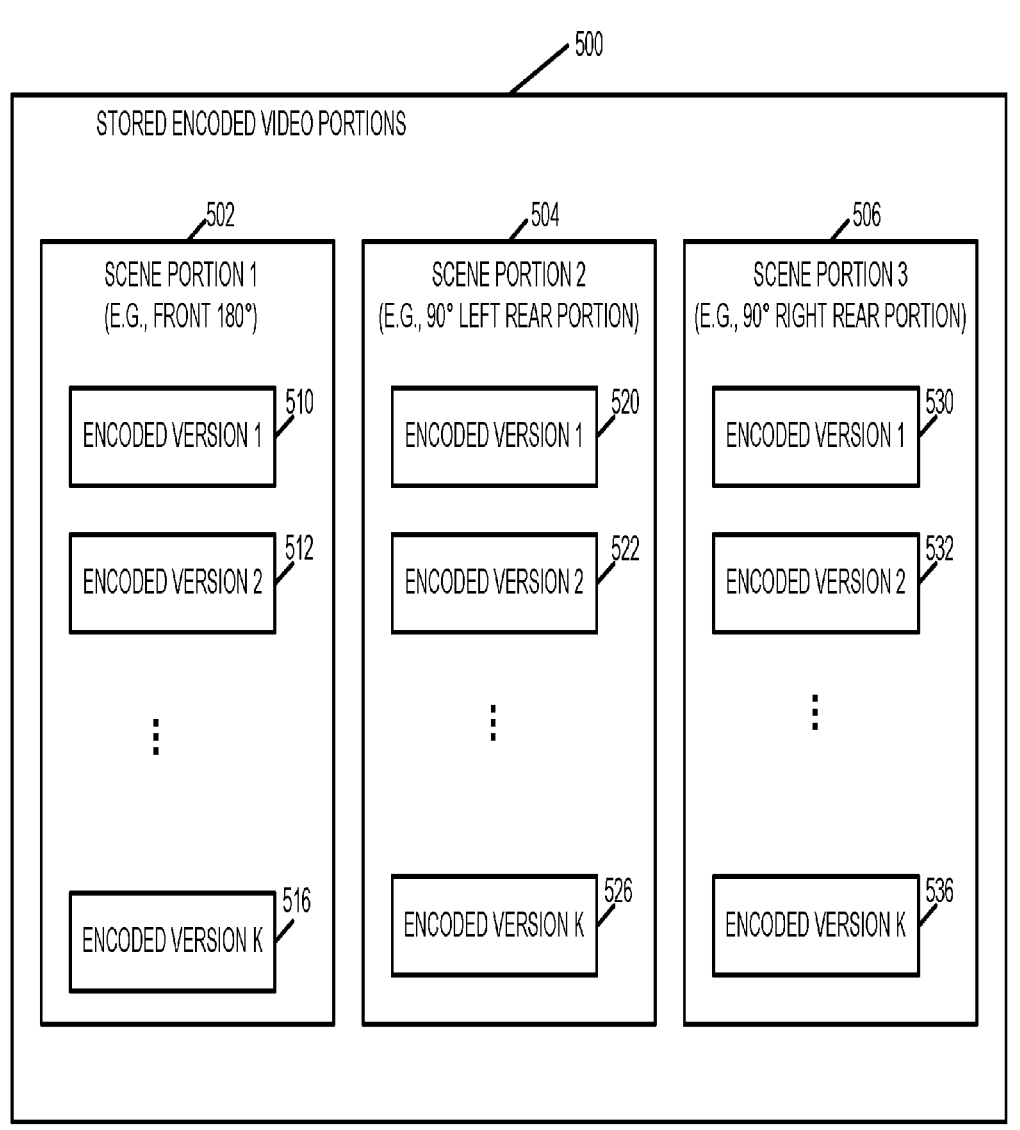
FIG. 5 illustrates stored encoded portions of an input stereoscopic scene that has been partitioned into 3 portions.

FIG. 5 illustrates stored encoded portions 500 of an input stereoscopic scene that has been partitioned into 3 exemplary portions. The stored encoded portions may be stored in the content delivery system 104, e.g., as data/information in the memory. The stored encoded portions 500 of the stereoscopic scene includes 3 different sets of encoded portions, where each portion corresponding to a different scene area and each set including a plurality of different encoded versions of the corresponding scene portion. Each encoded version is a version of encoded video data and thus represents multiple frames which have been coded. It should be appreciated that each encoded version 510, 512, 516 being video corresponds to multiple periods of time and that when streaming, the portion, e.g., frames, corresponding to the period of time being played back will used for transmission purposes.

As illustrated and discussed above with regard to FIG. 4, each scene portion, e.g., front, rear scene portions, may be encoded using a plurality of different encoders to produce K different versions of the same scene portion. The outputs of each encoder corresponding to a given input scene are grouped together as a set and stored. The first set of encoded scene portions 502 corresponds to the front 180 degree scene portion, and includes encoded version 1 510 of the front 180 degree scene, encoded version 2 512, . . . , and encoded version K 516. The second set of encoded scene portions 504 corresponds to the scene portion 2, e.g., 90 degree left rear scene portion, and includes encoded version 1 520 of the 90 degree left rear scene portion, encoded version 2 522, . . . , and encoded version K 526 of the 90 degree left rear scene portion. Similarly the third set of encoded scene portions 506 corresponds to the scene portion 3, e.g., 90 degree right rear scene portion, and includes encoded version 1 530 of the 90 degree right rear scene portion, encoded version 2 532, . . . , and encoded version K 536 of the 90 degree right rear scene portion.

The various different stored encoded portions of the 360 degree scene can be used generate various different bit rate streams for sending to the customer playback devices.

FIG. 6 is a flowchart 600 illustrating the steps of an exemplary method of providing image content, in accordance with an exemplary embodiment. The method of flowchart 600 is implemented in some embodiments using the capturing system shown in FIG. 1.

The method starts in step 602, e.g., with the delivery system being powered on and initialized. The method proceeds from start step 602 to steps 604. In step 604 the content delivery system 104, e.g., the server 114 within the system 104, receives a request for content, e.g., a request for a previously encoded program or, in some cases, a live event being encoded and steamed in real or near real time, e.g., while the event is still ongoing.

In response to the request, in step 604, the server 114 determines the data rate available for delivery. The data rate may be determined from information included in the request indicating the supported data rates and/or from other information such as network information indicating the maximum bandwidth that is available for delivering content to the requesting device. As should be appreciated the available data rate may vary depending on network loading and may change during the period of time in which content is being streamed. Changes may be reported by the user device or detected from messages or signals indicating that packets are being dropped or delayed beyond a desired amount of time indicating that the network is having difficulty supporting the data rate being used and that the currently available data rate is lower than the original data rate determined to be available for use.

Operation proceeds from step 608 to step 608 where the current head position of the user device from which the request for content is initialized, e.g., the current head position at the time of the request is to be the 0 degree position. The 0 degree or forward looking position may be re-initialized in some embodiments by the user with the playback device signaling that a re-initialization is to occur. Over time the user's head position and/or changes in the user's head position, e.g., relative to the original head position, are reported to the content delivery system 104 and the updated position is used as will be discussed below to make content delivery decisions.

Operation proceeds from step 608 to step 610 in which portions of a 360 degree scene corresponding to the requested content are sent to initialize the playback device. In at least some embodiments the initialization involves sending a full 360 degree set of scene data, e.g., N portions where the 360 degree scene is divided into N portions.

As a result of the initialization in step 610, the playback device will have scene data corresponding to each of the different portions of 360 degree possible viewing area. Accordingly, if the user of the playback device suddenly turns to the rear, at least some data will be available to display to the user even if it is not as up to date as the portion the user was viewing prior to turning his head.

Operation proceeds from step 610 to steps 612 and step 622. Step 622 corresponds to a global scene update path which is used to make sure the playback device receives an updated version of the entire 360 degree scene at least once every global update period. Having been initialized in step 610 the global update process is delayed in wait step 622 for a predetermined period of time. Then in step 624 a 360 degree scene update is performed. The dashed arrow 613 represents the communication of information on which scene portions were communicated to the playback device during the aid period corresponding to step 622. In step 624 an entire 360 degree scene may be transmitted. However, in some embodiments not all portions are transmitted in step 624. Portions of the scene which were updated during the wait period 622 are omitted in some embodiments from the update performed in step 624 since they were already refreshed during the normal streaming processes which sends at least some portions of the scene based on the user's head position.

Operation proceeds from step 624 back to wait step 622 where a wait is performed prior to the next global update. It should be appreciated that by adjusting the wait period used in step 622 different global refresh rates can be supported. In some embodiments, the content server selects a wait period and thus global reference period, based on the type of scene content being provided. In the case of sporting events where the main action is in the forward facing area and one of the reasons for the refresh is possible changes in outdoor lighting conditions, the wait period may be relatively long, e.g., on the order of a minute or minutes. In the case of a rock concert where the action and activity in the crowd may change frequently as different songs are performed the global refresh rate maybe, and sometimes is, higher than for sporting events since a user may want to turn and see the crowds reaction and get a feel for what is going on in the crowd in addition to what is going on in the front stage viewing area.

In some embodiments the global reference period is changed as a function of the portion of the presentation being streamed. For example, during a game portion of a sporting event the global refresh rate may be relatively low but during a post touchdown moment or during a time out or intermission where a person at the event or viewing the event via the playback device is more likely to turn his or her head from the forward main area, the global reference rate may, and in some embodiment is, increased by reducing the wait, e.g., refresh period control, used in step 622.

While the global refresh process has been described with reference to steps 622 and 624, the normal supply of portions of scene are described. As should be appreciated the normal refresh of a scene or scene portion will occur for at least one portion, data rate permitting, at the supported video frame rate. Thus, with regard to at least one frame portion, e.g., the portion which his/or her head is indicated to be facing, will be supplied at the full video streaming frame rate assuming the available data rate is sufficient.

In step 612 scene portions are selected to be provided based on the indicated head position, e.g., viewing angle, of the user. The selected portions are transmitted, e.g., streamed, to the playback device, e.g., on a periodic basis. The rate at which the data corresponding to the portions are streamed depends on, in some embodiments the video frame rate. For example, at least one selected portion will be streamed at the full frame rate being supported. While at least one scene portion is selected in step 612 normally multiple scene portions are selected, e.g., the scene portion which the user is facing as well as the next nearest scene portion. Additional scene portions may also be selected and supplied if the data rate available is sufficient to support communication of multiple frame portions.

After the scene portions to be streamed are selected in step 612, operation proceeds to step 614 wherein the encoded version of the selected stream portions are selected, e.g., based on the available data rate and the viewing position of the user. For example a full rate high resolution version of the scene portion which the user is facing as indicated by the current reported head portion may and normally will be streamed. One more scene portions to the left and/or right of the current head position may be selected to be streamed as a lower resolution, lower temporal rate or using another encoding approach which reduces the amount of bandwidth required to transmit the scene area not currently being viewed. Selection of the encoded version of the adjacent scene portion will depend on the amount of bandwidth reaming after a high quality version of the scene portion currently being viewed is transmitted. While scene portions which are not currently being viewed may be sent as a lower resolution encoded version or as an encoded version with a greater temporal distance between frames, full resolution high quality version may be sent periodically or frequently if there is sufficient bandwidth available.

In step 616 the selected encoded versions of the selected scene portions are sent to the playback device which requested the content. Thus, in step 616 the encoded content corresponding to one or more portions, e.g., stereoscopic video content corresponding to multiple sequential frames, is streamed to the playback device.

Operation proceeds from step 616 to step 618 in which information indicating a current head position of a user is received. This information may be sent from the playback device periodically and/or in response to detecting a change in head position. In addition to changes in head position, changes in the available data rate may affect what content is streamed. Operation proceeds form step 618 to step 620 in which a determination of the current data rate which can be used for content delivery to the playback device. Thus, the content delivery system can detect changes in the amount of bandwidth available to support streaming to the requesting device.

Operation proceeds from step 620 to step 612 with streaming continuing until the content is fully delivered, e.g., the program or event ends, or until a signal is received from the playback device which requested the content indicating that the session is to be terminated or the failure to receive an expected signal from the playback device such as a head position update is detected indicating that the playback device is no longer in communication with the content server 114.

From the scene data delivered in the manner described above, the playback device will have at least some data corresponding to each scene portion available to it to display in the event a user quickly turns his or her head. It should be appreciated that user's rarely turn their head completely around in a very short period of time since this is an uncomfortable change in viewing position for many people. Accordingly, while the full 360 degree scene may not be transmitted at all times, a high quality version of the scene portion(s) most likely to be viewed at any given time may be streamed and made available to the user.

The content delivery system 104 can support a large number of concurrent users since, the encoding process allows the N portions of a scene to be transmitted and processed differently to different users without having to encode the content separately for each individual user. Thus, while a number of parallel encoders may be used to support real time encoding to allow for real or near real time streaming of sports or other events, the number of encoders used tends to be far less than the number of playback devices to which the content is streamed.

While the portions of content are described as portions corresponding to a 360 degree view it should be appreciated that the scenes may, and in some embodiments do, represent a flattened version of a space which also has a vertical dimension. The playback device is able to map the scene portions using a model of the 3d environment, e.g., space, and adjust for vertical viewing positions. Thus, the 360 degrees which are discussed in the present application refer to the head position relative to the horizontal as if a user changed his viewing angle left or right while holding his gaze level.

Figure 7:
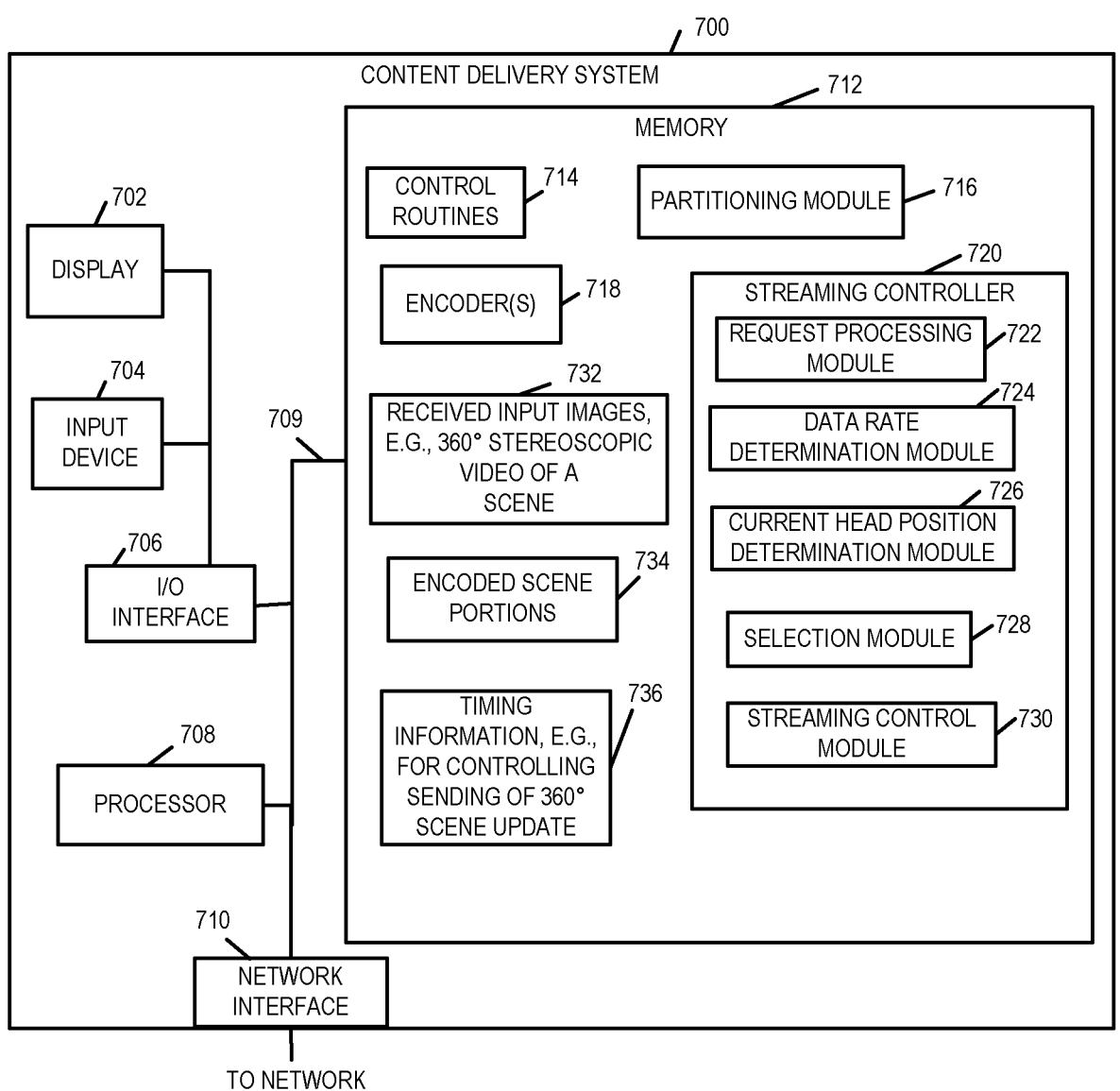
FIG. 7 illustrates an exemplary content delivery system encoding capability that can be used to encode and stream content in accordance with the features of the invention.

FIG. 7 illustrates an exemplary content delivery system 700 with encoding capability that can be used to encode and stream content in accordance with the features of the invention.

The system may be used to perform encoding, storage, and transmission and/or content output in accordance with the features of the invention. In some embodiments the system 700 or the elements therein perform the operation corresponding to the process illustrated in FIG. 6. The content delivery system 700 may be used as the system 104 of FIG. 1. While the system shown in FIG. 7 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the computer system 700 to implement the immersive stereoscopic video acquisition, encoding, storage, and transmission and/or output methods in accordance with the invention. The memory 712 includes control routines 714, a partitioning module 706, encoder(s) 718, a streaming controller 720, received input images 732, e.g., 360 degree stereoscopic video of a scene, encoded scene portions 734, and timing information 736. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The streaming controller 720 is configured to control streaming of encoded content for delivering the encoded image content to one or more customer devices, e.g., over the communications network 105. In various embodiments various steps of the flowchart 600 are implemented by the elements of the streaming controller 720. The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determina-tion module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives ad processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured communicating at least a sufficient number of the N portions to the playback device on a periodic basis to allow the playback device to fully refresh a 360 degree version of said scene at least once during each refresh period.

Figure 8:
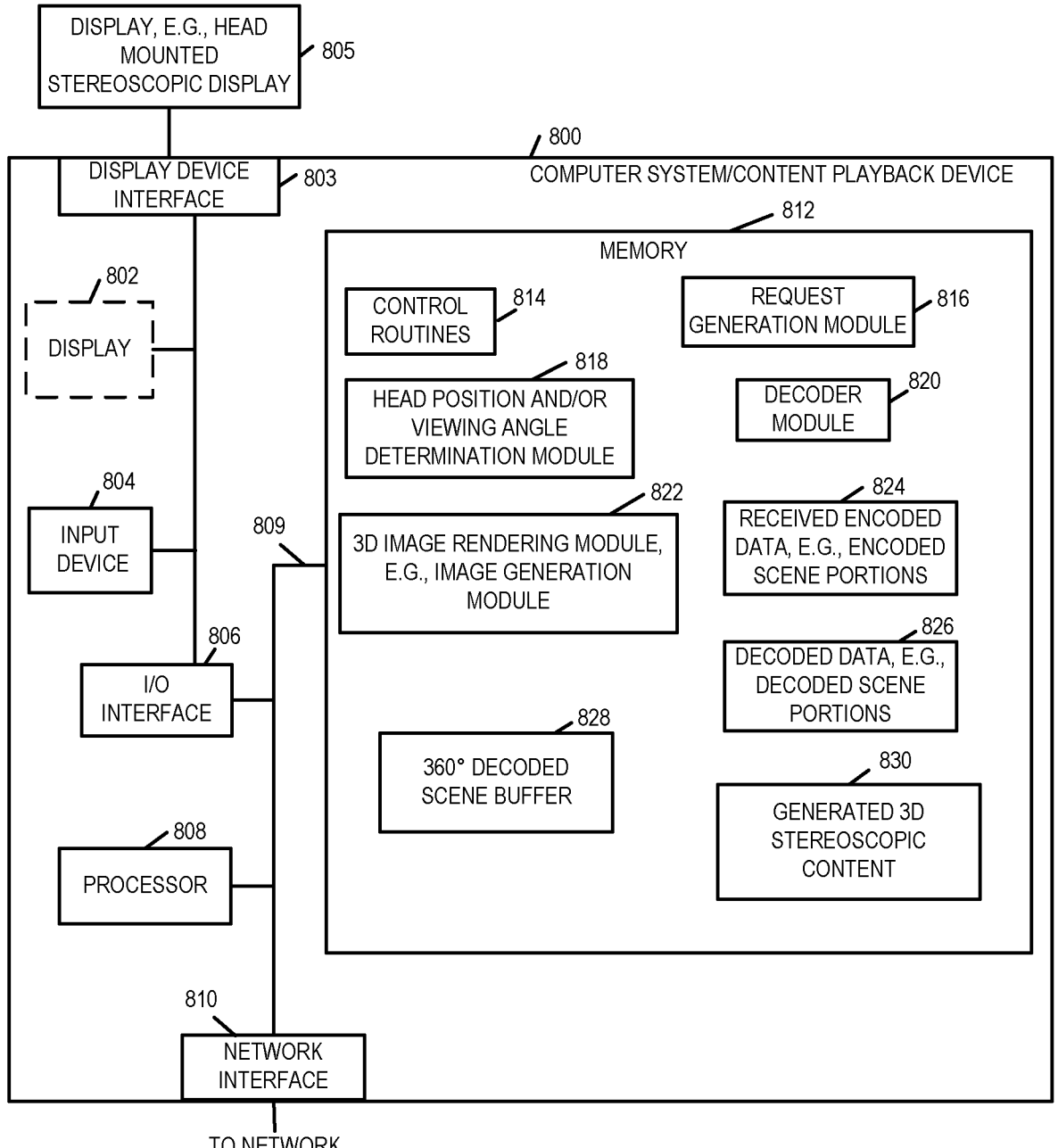
FIG. 8 illustrates an exemplary content playback device that can be used to receive, decode and display the content streamed by the system of FIG. 7.

FIG. 8 illustrates a computer system/playback device 800 implemented in accordance with the present invention which can be used to receive, decode, store and display imaging content received from a content delivery system such as the one shown in FIGS. 1 and 7. The playback device may be used with a 3d head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

The memory 812 includes various modules, e.g., routines, which when executed by the processor 808 control the playback device 800 to decoding and output operations in accordance with the invention. The memory 812 includes control routines 814, a request for content generation module 816, a head position and/or viewing angle determination module 818, a decoder module 820, a stereoscopic image rendering module 822 also referred to as a 3D image generation module, and data/information including received encoded image content 824, decoded image content 826, a 360 degree decoded scene buffer 828, and generated stereoscopic content 830.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data 826. The decoded image data 826 may include decoded stereoscopic scene and/or decoded scene portions.

The 3D image rendering module 822 generates 3D image in accordance with the features of the invention, e.g., using the decoded image content 826, for display to the user on the display 802 and/or the display device 805. The generated stereoscopic image content 830 is the output of the 3D image generation module 822. Thus the rendering module 822 renders the 3D image content 830 to the display. In some embodiments the display device 805 may be a 3D display such as an oculus rift. The operator of the playback device 800 may control one or more parameters via input device 804 and/or select operations to be performed, e.g., select to display 3D scene.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

The invention claimed is:

1. A method of delivering content corresponding to a 360 degree scene, the method comprising:
    partitioning the 360 degree scene, at a content source, into a plurality of scene portions;
    generating a plurality of encoded versions, at the content source, of each of the plurality of scene portions;
    transmitting a request, from a playback device to the content source, for image data associated with the 360 degree scene, wherein the request comprises a head position of a user at the playback device corresponding to a first portion of the 360 degree scene; responsive to the request:
    transmitting, from the content source to the playback device, a combination of encoded versions comprising encoded versions of the first portion of the 360 degree scene, encoded versions of scene portions adjacent to the first portion, and encoded versions of scene portions that are not adjacent to either the first portion or the scene portions adjacent to the first portion, to initialize scene memory at the playback device;

selecting a first encoded version of a first portion of the plurality of scene portions of the 360 degree scene, wherein the first portion of the 360 degree scene is determined based on the head position of the user, and wherein the first encoded version of the first portion is selected from a plurality of encoded versions of the first portion based on an available data rate for transmitting content between the playback device and a content source, the first encoded version of the first portion being associated with a first bit rate;

selecting a first encoded version of a second portion of the plurality of scene portions of the 360 degree scene from a plurality of encoded versions of the second portion, wherein the first encoded version of the second portion is associated with a second bit rate lower than the first bit rate; and presenting the first encoded version of the first encoded portion and the first encoded version of the second encoded portion at the playback device.

2. The method of claim 1, wherein the first portion comprises a first partition of the 360 degree scene and the second portion comprises a second partition of the 360 degree scene different than the first partition.

3. The method of claim 2, wherein the plurality of encoded versions of the first portion each comprises the first portion encoded at different bit rates.

4. The method of claim 2, wherein the first partition and the second partition are generated by a partitioning module partitioning the 360 degree scene into a plurality of partitions comprising the first partition and the second partition.

5. The method of claim 1, wherein the first portion and the second portion comprise a subset of the 360 degree scene.

6. The method of claim 1, wherein the available data rate is determined based on a supported data rate of the playback device.

7. The method of claim 6, wherein the available data rate is further determined based on network traffic measurements.

8. A non-transitory computer readable medium comprising computer readable code for delivering content corresponding to a 360 degree scene, the computer readable code executable by one or more processors to:

partition the 360 degree scene, at a content source, into a plurality of scene portions;

generate a plurality of encoded versions, at the content source, of each of the plurality of scene portions;

transmit a request, from a playback device to the content source, for image data associated with the 360 degree scene, wherein the request comprises a head position of a user at the playback device corresponding to a first portion of the 360 degree scene;

responsive to the request:

transmit, from the content source to the playback device, a combination of encoded versions comprising encoded versions of the first portion of the 360 degree scene, encoded versions of scene portions adjacent to the first portion, and encoded versions of scene portions that are not adjacent to either the first portion or the scene portions adjacent to the first portion, to initialize scene memory at the playback device;

select a first encoded version of a first portion of the 360 degree scene from among a plurality of versions of the first portion of the plurality of scene portions of the 360 degree scene each corresponding to a different bit rate, wherein the first portion of the 360 degree scene is selected based on the head position of the user, and an available data rate for transmitting content between the playback device and a content source, the first encoded version of the first portion being associated with a first bit rate;

select a first encoded version of a second portion of the plurality of scene portions of the 360 degree scene from a plurality of encoded versions of the second portion each corresponding to a different bit rate, wherein the first encoded version of the second portion is associated with a second bit rate lower than the first bit rate; and present the first encoded version of the first encoded portion and the first encoded version of the second encoded portion at the playback device.

9. The non-transitory computer readable medium of claim 8, wherein the first portion comprises a first partition of the 360 degree scene and the second portion comprises a second partition of the 360 degree scene different than the first partition.

10. The non-transitory computer readable medium of claim 9, wherein the first encoded version of the first portion is selected from among a plurality of encoded versions for the first portion each comprising the first portion and encoded at different bit rates.

11. The non-transitory computer readable medium of claim 9, wherein the first partition and the second partition are generated by a partitioning module partitioning the 360 degree scene into a plurality of partitions comprising the first partition and the second partition.

12. The non-transitory computer readable medium of claim 8, wherein the first portion and the second portion comprise a subset of the 360 degree scene.

13. The non-transitory computer readable medium of claim 8, wherein the available data rate is determined based on a supported data rate of the playback device.

14. The non-transitory computer readable medium of claim 13, wherein the available data rate is further determined based on network traffic measurements.

15. A system comprising:

one or more processors; and one or more computer readable media comprising computer readable code for delivering content corresponding to a 360 degree scene, the computer readable code executable by the one or more processors to cause the system to: partitioning the 360 degree scene, at a content source, into a plurality of scene portions; generating a plurality of encoded versions, at the content source, of each of the plurality of scene portions; transmitting a request, from a playback device to the content source, for image data associated with the 360 degree scene, wherein the request comprises a head position of a user at the playback device corresponding to a first portion of the 360 degree scene; responsive to the request: transmit, from the content source to the playback device, a combination of encoded versions comprising encoded versions of the first portion of the 360 degree scene, encoded versions of scene portions adjacent to the first portion, and encoded versions of scene portions that are not adjacent to either the first portion or the scene portions adjacent to the first portion, to initialize scene memory at the playback device; select a first encoded version of a first portion of the plurality of scene portions of the 360 degree scene from among a plurality of versions of the first portion of the 360 degree scene each corresponding to a different bit rate, wherein the first portion of the 360 degree scene is selected based on the head position of the user, and an available data rate for transmitting content between the playback device and a content source, the first encoded version of the first portion being associated with a first bit rate; select a first encoded version of a second portion of the plurality of scene portions of the 360 degree scene from a plurality of encoded versions of the second portion each corresponding to a different bit rate, wherein the first encoded version of the second portion is associated with a second bit rate lower than the first bit rate; and present the first encoded version of the first encoded portion and the first encoded version of the second encoded portion at the playback device.

16. The system of claim 15, wherein the first portion comprises a first partition of the 360 degree scene and the second portion comprises a second partition of the 360 degree scene different than the first partition.

17. The system of claim 16, wherein the first encoded version of the first portion is selected from among a plurality of encoded versions for the first portion each comprising the first portion and encoded at different bit rates.

18. The system of claim 16, wherein the first partition and the second partition are generated by a partitioning module partitioning the 360 degree scene into a plurality of partitions comprising the first partition and the second partition.

19. The system of claim 15, wherein the first portion and the second portion comprise a subset of the 360 degree scene.

20. The system of claim 15, wherein the available data rate is determined based on a supported data rate of the playback device.

* * * * *